United States Patent
Choi

(10) Patent No.: US 8,836,178 B2
(45) Date of Patent: Sep. 16, 2014

(54) LINEAR VIBRATOR

(75) Inventor: Joon Choi, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 509 days.

(21) Appl. No.: 13/115,917

(22) Filed: May 25, 2011

(65) Prior Publication Data

US 2012/0032534 A1  Feb. 9, 2012

(30) Foreign Application Priority Data

Aug. 9, 2010 (KR) .................. 10-2010-0076553

(51) Int. Cl.
*H02K 33/00* (2006.01)

(52) U.S. Cl.
USPC .......................... 310/25; 310/90.5

(58) Field of Classification Search
CPC ....................................... H02K 7/09
USPC ................ 310/15, 25, 29, 81, 36–38, 310/12.23–12.26, 12.31–12.33
See application file for complete search history.

(56) References Cited

U.S. PATENT DOCUMENTS

| | | | | |
|---|---|---|---|---|
| 4,017,694 | A * | 4/1977 | King | 381/415 |
| 7,358,633 | B2 * | 4/2008 | Kweon et al. | 310/81 |
| 8,130,086 | B2 * | 3/2012 | Choi et al. | 340/407.1 |
| 2004/0245864 | A1 * | 12/2004 | Bailey | 310/15 |
| 2005/0184601 | A1 * | 8/2005 | Kweon et al. | 310/36 |
| 2005/0285454 | A1 * | 12/2005 | Choi et al. | 310/14 |

* cited by examiner

*Primary Examiner* — Quyen Leung
*Assistant Examiner* — Naishadh Desai
(74) *Attorney, Agent, or Firm* — Bracewell & Giuliani LLP; Brad Y. Chin

(57) ABSTRACT

Disclosed herein is a linear vibrator, including: a stator including a coil; and a vibrator including a magnet opposite to the coil, wherein the linear vibrator is linearly vibrated due to electromagnetic induction of the coil and the magnet, the magnet is formed in a disc shape in which a cut part is formed by cutting a portion thereof, a magnetic fluid band is formed on an outer peripheral surface of the magnet, and a portion of the magnetic fluid band is in contact with the coil. According to the present invention, there is provided the linear vibrator capable of suppressing weak vibration generated at the time of external impact or movement, previously preventing noise generated as the vibrator applies an impact to the stator due to excessive vibration, and minimizing attenuation of the linear vibration quantity as the cut part that is formed by cutting a portion of the magnet to form the air gap with the coil.

13 Claims, 4 Drawing Sheets

LINEAR VIBRATOR

CROSS REFERENCE TO RELATED APPLICATION

This application claims the benefit of Korean Patent Application No. 10-2010-0076553, filed on Aug. 9, 2010, entitled "Linear Vibrator", which is hereby incorporated by reference in its entirety into this application.

BACKGROUND OF THE INVENTION

1. Technical Field

The present invention relates to a linear vibrator.

2. Description of the Related Art

In general, vibration generating apparatuses are mounted on mobile communications terminals in order to provide a user with vibrations in various objects and shapes. The vibration generating apparatuses have been improving daily according to compactness, slimness, high-function of the mobile communications terminals. One of them is a linear vibrator. The linear vibrator includes a stator including a coil, and a vibrator including a magnet opposite to the coil and a weight body. The linear vibrator linearly vibrates due to electromagnetic induction of the coil and the magnet.

More specifically, the linear vibrator vibrates, while the vibrator mounted on a spring vertically or horizontally performs a linear motion due to electromagnetic force of the magnet and the coil. Therefore, the linear vibrator has less friction and abrasion as compared to a vibration motor, thereby having a long life span. In addition, the linear vibrator can be compact, thereby having been currently developed in various shapes.

However, in the case of the linear vibrator according to the prior art, weak vibrations are generated due to an external impact or the shaking of the weight body while moving. In addition, when a damper member, a friction member, or the like is mounted in order to solve weak vibrations, a reverse effect of reducing vibration quantity occurs.

SUMMARY OF THE INVENTION

The present invention has been made in an effort to provide a linear vibrator that forms a magnetic fluid band on an outer peripheral surface of a magnet to suppress weak vibration generates at the time of external impact or movement and to previously prevent noise generated as a vibrator applies impact to a stator due to excessive vibration, and forms a cut part which is formed by cutting a portion of the magnet to form an air gap with a coil to minimize attenuation of vibration quantity.

A linear vibrator according to a preferred embodiment of the present invention includes: a stator including a coil; and a vibrator including a magnet opposite to the coil, wherein the linear vibrator is linearly vibrated due to electromagnetic induction of the coil and the magnet, the magnet is formed in a disc shape in which a cut part is formed by cutting a portion thereof, a magnetic fluid band is formed on an outer peripheral surface of the magnet, and a portion of the magnetic fluid band is in contact with the coil.

According to a first embodiment of the present invention, a pair of cut parts of the magnet is formed on the outer peripheral surface of the magnet, opposite to each other.

According to a second embodiment of the present invention, two pairs of cut parts of the magnet are formed on the outer peripheral surface of the magnet, opposite to each other.

According to a third embodiment of the present invention, three cut parts of the magnet are formed on the outer peripheral surface of the magnet at the same interval.

The vibrator further includes a plate yoke attached to one surface of the magnet and the plate yoke has a cut part corresponding to the cut part of the magnet.

A portion of the outer peripheral surface of the magnetic fluid band is in internal contact with the coil.

The stator includes: a case having an internal space and an opening formed downwards; a coil received in the internal space of the case and is applied with current; and a bracket fixed with the coil and sealing the internal space by covering the opening of the case.

The stator further includes a circuit substrate mounted on the bracket and applying external power to the coil.

A damper is formed on the bracket, opposite to the vibrator.

The damper is made by selecting one of magnetic fluid, rubber, cork, and polypropylene.

A portion of the magnetic fluid band is in internal contact with the coil.

The vibrator includes: a magnet; a yoke coupled to surround the magnet; and a weight body coupled to an outer peripheral surface of the yoke.

The vibrator further includes a plate yoke attached to the other side of the magnet, opposite to the yoke coupled to one side of the magnet, and the plate yoke has a cut part corresponding to the cut part of the magnet.

The linear vibrator further includes a spring of which lower end is fixed to the stator and upper end is fixed to the vibrator to elastically support a linear motion of the vibrator.

The spring is formed with a damper protruded to the stator side opposite to the vibrator. Further, the damper is made by selecting one of magnetic fluid, rubber, cork, and polypropylene.

DESCRIPTION OF THE PREFERRED EMBODIMENTS

Figure 1:
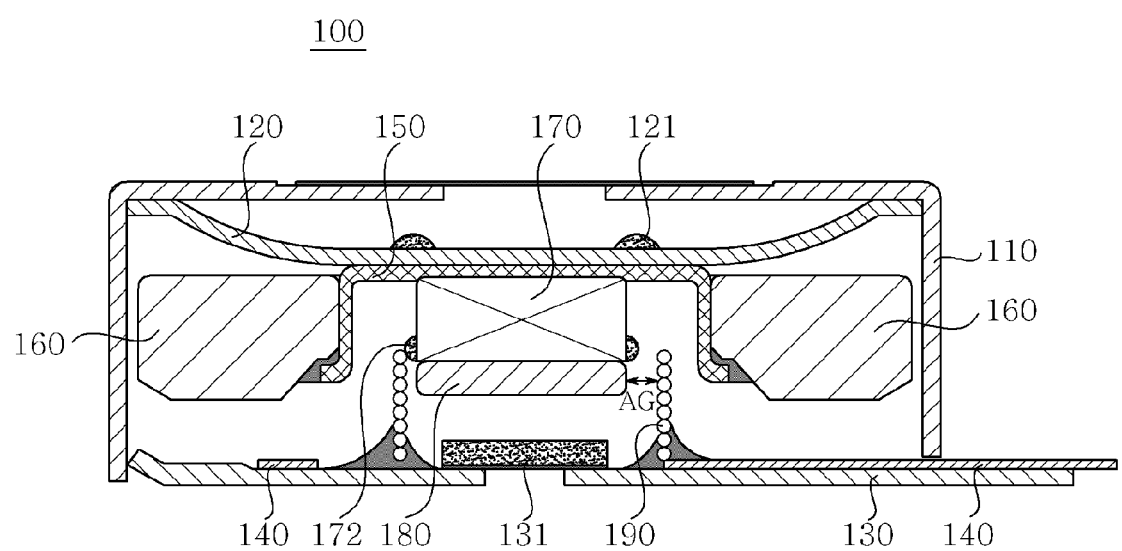
FIG. 1 is a cross-sectional view schematically showing a linear vibrator according to the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of a linear vibrator according to the present invention will be described in detail with reference to the accompanying drawings.

Figure 2:
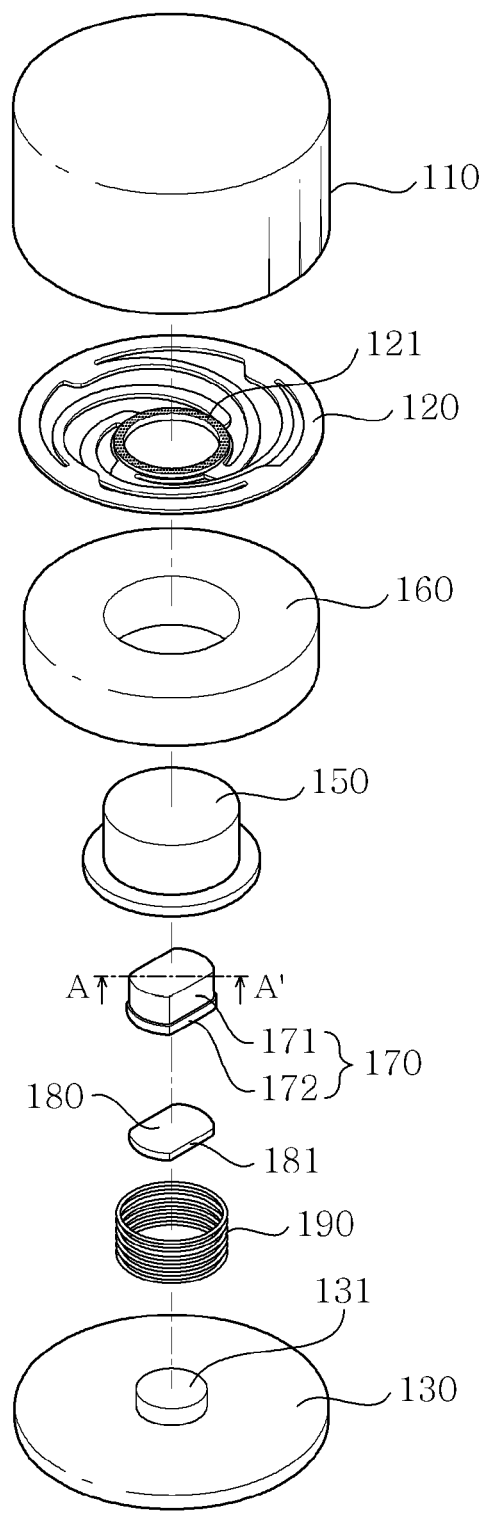
FIG. 2 is an exploded perspective view schematically showing the linear vibrator of FIG. 1.

FIG. 1 is a cross-sectional view schematically showing a linear vibrator according to the present invention, and FIG. 2 is an exploded perspective view schematically showing the linear vibrator of FIG. 1. More specifically, FIG. 1 is a cross-sectional view taken along line A-A' of the linear vibrator of FIG. 2. As shown in the figure, the linear vibrator 100 includes a stator including a coil 190, and a vibrator including a magnet 170 opposite to the coil 190. The linear vibrator 100 linearly vibrates due to electromagnetic induction of the coil 190 and the magnet 170.

More specifically, the linear vibrator 100 includes the stator including a case 110, the coil 190, a bracket 130, and a circuit substrate 140, the vibrator including the magnet 170, a yoke 150, a weight body 160, and a plate yoke 180, and a spring 120 of which each end is connected to the vibrator and the stator.

The case 110 is mounted to surround the upper portion and the side portion of the linear vibrator 100, which protects the apparatus from external impact. The case 110 has an internal space and an opening formed downwards.

The coil 190 is positioned in the case and is applied with current. In addition, when current is applied to the coil 190 according to a predetermined frequency, the magnetic field is induced around the coil 190.

As the coil 190 is fixed and the internal space of the case is sealed by covering the opening of the case 110, the bracket 130 entirely supports the linear vibrator. In addition, the bracket 130 is formed of non-magnetism or weak magnetism not to affect a driver and a damper 131 is formed on the upper surface thereof. When the vibrator vertically moves by the damper 131, it is possible to prevent generation of touch sound with the stator on the lower side.

In addition, as a material of the damper 131, not only a magnetic fluid capable of absorbing impact of the vibrator but also various materials capable of absorbing impact such as rubber, cork, polypropylene, or the like may be used.

The circuit substrate 140 is mounted on the bracket 130 to apply external power to the coil 190.

The yoke 150 configures a magnetic circuit, together with the magnet 170, to optimize magnetic flux of the magnet 170 linked with the coil 190 and to constantly induce the intensity of the magnetic field. The yoke 150 has protrusions integrally formed at two lower edges so that the weight bodies 160 are easily seated thereon, having a circular shape surrounding the upper portion and the side portions of the magnet 170. In addition, a connection part (not shown) is protruded from the upper portion of the yoke 150 so that the spring 120 is connected thereto. As the weight body 160 is seated and fixed to the protrusion of the yoke 150, the weight body 160 is coupled to the yoke 150.

The weight body 160 is coupled to the outer peripheral surface of the yoke to generate vibration by the interaction between the magnet 170 and the coil, as described above. In addition, it is preferable that the weight body 160 has a heavier specific gravity than iron. This is to increase mass of the vibrator within the same volume to control a resonant frequency related to the mass of the vibrator, thereby maximizing vibration quantity. In addition, the weight body 160 may expand to the side surface to have greater mass, such that the mass in the limited volume is increased, thereby making it possible to maximize the vibration quantity.

The spring 120 is an elastic member that is connected to the vibrator to generate a maximum displacement at a resonant point when the frequency is applied, thereby causing vibration. An upper end of the spring 120 is bonded to an inner side of the upper surface of the case 110 that is the stator or is fixed thereto by a fixing ring (not shown) press-fitted from the lower portion thereof, and a lower end of the spring 120 is fixed to an upper portion of the yoke that is the vibrator to elastically support the vibrator.

It is preferable that the spring 120 is implemented to be a plate spring that is modifiable from a state in which one side and the other side thereof are in parallel by being spaced apart from each other at a predetermined distance when the vibrator vertically moves to a state in which they reach the same plane.

In addition, the spring 120 is formed with a damper 121 protruded to the stator side to be opposite to the vibrator. In other words, the damper 121 is formed on the position where the yoke corresponds to the case, thereby absorbing vibration of the vibrator. Therefore, it is possible to prevent touch noise and abrasion from being generated as the vibrator is in contact with the vibrator to the stator due to excessive vibration of the vibrator when the vibrator is linearly vibrated. In addition, as a material of the damper, not only a magnetic fluid capable of absorbing impact of the vibrator but also various materials capable of absorbing impact such as rubber, cork, polypropylene, or the like may be used.

It is preferable that the magnet 170 is disposed to be opposite to the coil 190 and a portion thereof is inserted into the inside of the coil 190 so that the vibrator can be linearly vibrated due to an electromagnetic induction phenomenon of the magnetic flux of the magnet 170 and the coil 190.

More specifically, the magnet 170 is formed to have a disc shape in which a cut part 171 is formed, wherein the cut part is formed by cutting a portion of the magnet 170. A magnetic fluid band 172 is formed on the outer peripheral surface of the magnet. The magnetic fluid band 172, which is a material having a property of being collected at the magnetic flux of the magnet 170, is applied to one surface of the magnet 170.

In addition, the magnetic fluid is made by stabilizing and diffusing magnetic powders in liquid in a chloride shape and adding surfactants so that the magnetic powders are not precipitated or agglomerated due to gravity, magnetic field, or the like. As an example, the magnetic fluid is made by diffusing triiron tetraoxide and minute particles of an iron-cobalt alloy in oil or water or by recently diffusing cobalt in toluene.

Such magnetic powders are ultra-fine particle powders of 0.01 to 0.02 μm and performs Brownian motion, which is a unique property of ultra-fine particles. The magnetic powders have a property where concentration of the magnetic powder particles in the fluid is constantly maintained even though external magnetic field, gravity, centrifugal force is applied thereto.

In addition, as shown in FIG. 1, the magnetic fluid band 172 is in partial contact with an inner surface of a hollow portion of the coil 190, thereby making it possible to previously prevent touch sound generated when the vibrator including the magnet applies an impact to the stator that is a prime moving part due to excessive vibration, prevent the vibrator from horizontally vibrating due to an external impact, and be able to be smoothly slid when the vibrator is vibrated. In addition, an air gap AG is ensured between the coil 190 and the magnet by the cut part of the magnet, thereby making it possible to attenuate weak vibration and suppress reduction of linear vibration quantity simultaneously.

Figure 3:
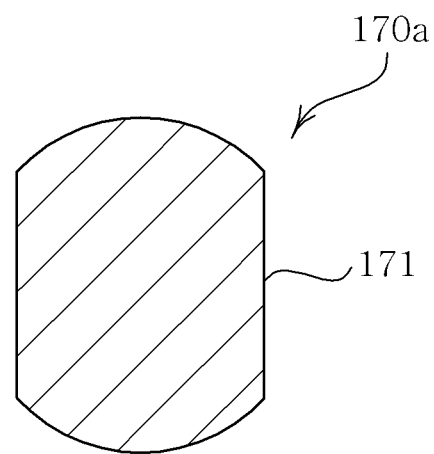
FIG. 3 is a cross-sectional view schematically showing a magnet according to a first preferred embodiment of the present invention in the linear vibrator according to the present invention.
Figure 4:
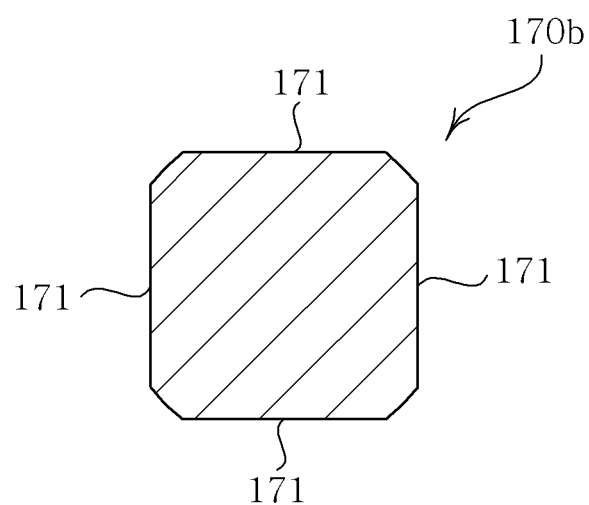
FIG. 4 is a cross-sectional view schematically showing a magnet according to a second preferred embodiment of the present invention in the linear vibrator according to the present invention.
Figure 5:
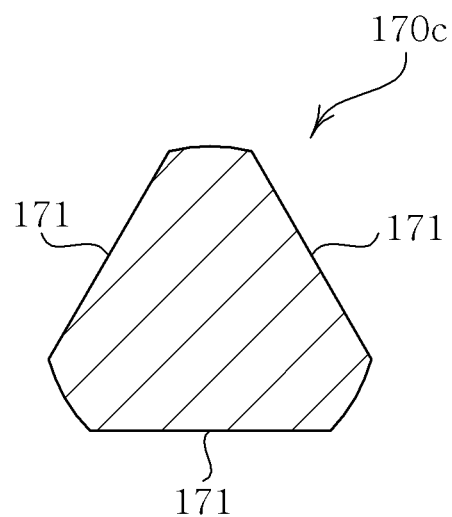
FIG. 5 is a cross-sectional view schematically showing a magnet according to a third preferred embodiment of the present invention in the linear vibrator according to the present invention.

In order to obtain the effects as described above, the magnet may have various shapes as shown in FIGS. 3 to 5. More specifically, a magnet 170*a* shown in FIG. 3 shows a case in which a pair of cut parts 171 are formed on outer peripheral portion, opposite to each other in a disc shape, a magnet 170*b* shown in FIG. 4 shows a case in which two pairs of cut parts 171 are formed on outer peripheral portion, opposite to each other in a disc shape to have a quadrangular shape, and a magnet 170*c* shown in FIG. 5 shows a case in which three cut parts 171 are formed on the outer peripheral portion at the same interval in a disc shape to have a triangular shape.

The magnet 170 according to the present invention is made as described above and the magnetic fluid band 172 is attached to the outer peripheral portion of the magnet 170 to be in partial contact with the coil 190 to ensure the air gap.

The plate yoke 180, which constantly induces the intensity of magnetic field, is coupled to the other side of the magnet 170 of which one side is coupled to the yoke 150, the magnet 170 being opposite to the yoke 150. In addition, the plate yoke 180 is formed with a cut part 181 corresponding to the cut part of the magnet 170.

When electromagnetic force is generated through the coil 190, the magnetic flux passing through the coil 190 is horizontally formed on the magnet 170 and the magnetic field generated by the coil 190 is vertically formed, such that the vibration vertically vibrates. In this case, the dampers 131 and 121 can prevent friction sound with the stator at the time of excessive vibration of the vibrator, and the magnetic fluid band 172 can suppress the generation of weak vibration and ensure the air gap, while stably sliding the vibrator, thereby making it possible to prevent the reduction of the linear vibration quantity.

According to the present invention, there is provided the linear vibrator capable of suppressing weak vibration generated at the time of external impact or movement, previously preventing noise generated as the vibrator applies an impact to the stator due to excessive vibration, and minimizing attenuation of the linear vibration quantity as the cut part is formed by cutting a portion of the magnet to form the air gap with the coil.

Although the preferred embodiments of the present invention have been disclosed for illustrative purposes, they are for specifically explaining the present invention and thus a linear vibrator according to the present invention are not limited thereto, but those skilled in the art will appreciate that various modifications, additions and substitutions are possible, without departing from the scope and spirit of the invention as disclosed in the accompanying claims.

What is claimed is:

1. A linear vibrator, comprising:
   a stator including a coil; and
   a vibrator including a magnet opposite to the coil, a plate yoke attached to one surface of the magnet,
   wherein the linear vibrator is linearly vibrated due to electromagnetic induction of the coil and the magnet,
   the magnet is formed in a disc shape in which a cut part is formed by cutting a portion thereof,
   a magnetic fluid band is formed on an outer peripheral surface of the magnet,
   a portion of the magnetic fluid band is in contact with the coil,
   the plate yoke has a cut part corresponding to the cut part of the magnet, and
   wherein a portion of the outer peripheral surface of the magnetic fluid band is in contact with the coil.

2. The linear vibrator as set forth in claim 1, wherein a pair of cut parts of the magnet is formed on the outer peripheral surface of the magnet, opposite to each other.

3. The linear vibrator as set forth in claim 1, wherein two pairs of cut parts of the magnet are formed on the outer peripheral surface of the magnet, opposite to each other.

4. The linear vibrator as set forth in claim 1, wherein three cut parts of the magnet are formed on the outer peripheral surface of the magnet at the same interval.

5. The linear vibrator as set forth in claim 1, wherein the stator includes:
   a case having an internal space and an opening formed downwards;
   a coil received in the internal space of the case and is applied with current; and
   a bracket fixed with the coil and sealing the internal space by covering the opening of the case.

6. The linear vibrator as set forth in claim 5, wherein the stator further includes a circuit substrate mounted on the bracket and applying external power to the coil.

7. The linear vibrator as set forth in claim 5, wherein a damper is formed on the bracket, opposite to the vibrator.

8. The linear vibrator as set forth in claim 7, wherein the damper is made by selecting one of magnetic fluid, rubber, cork, and polypropylene.

9. The linear vibrator as set forth in claim 1, wherein the vibrator includes:
   a magnet;
   a yoke coupled to surround the magnet; and
   a weight body coupled to an outer peripheral surface of the yoke.

10. The linear vibrator as set forth in claim 9, wherein the vibrator further includes a plate yoke attached to the other side of the magnet, opposite to the yoke coupled to one side of the magnet, and the plate yoke has a cut part corresponding to the cut part of the magnet.

11. The linear vibrator as set forth in claim 1, further comprising a spring of which lower end is fixed to the stator and upper end is fixed to the vibrator to elastically support a linear motion of the vibrator.

12. The linear vibrator as set forth in claim 11, wherein the spring is formed with a damper protruded to the stator side opposite to the vibrator.

13. The linear vibrator as set forth in claim 12, wherein the damper is made by selecting one of magnetic fluid, rubber, cork, and polypropylene.

* * * * *